United States Patent
Mu

(10) Patent No.: US 10,531,751 B2
(45) Date of Patent: Jan. 14, 2020

(54) INTELLIGENT PICTURE FRAME, AND METHOD FOR SWITCHING AN IMAGE ACQUISTION DEVICE THEREIN

(71) Applicant: BOE Technology Group Co., Ltd., Beijing (CN)

(72) Inventor: Xinxin Mu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 10 days.

(21) Appl. No.: 15/927,313

(22) Filed: Mar. 21, 2018

(65) Prior Publication Data

US 2019/0000244 A1    Jan. 3, 2019

(30) Foreign Application Priority Data

Jun. 29, 2017   (CN) .......................... 2017 1 0517874

(51) Int. Cl.
| | |
|---|---|
| *A47G 1/06* | (2006.01) |
| *G06T 1/00* | (2006.01) |
| *H04N 5/232* | (2006.01) |
| *H04N 5/225* | (2006.01) |
| *G09G 5/00* | (2006.01) |

(52) U.S. Cl.
CPC ............ *A47G 1/065* (2013.01); *G06T 1/0007* (2013.01); *G09G 5/00* (2013.01); *H04N 5/2252* (2013.01); *H04N 5/2258* (2013.01); *H04N 5/232* (2013.01); *G09G 2340/0442* (2013.01); *G09G 2340/0492* (2013.01); *G09G 2380/16* (2013.01)

(58) Field of Classification Search
CPC .............................. G09G 5/00; G09G 2380/16
See application file for complete search history.

(56) References Cited

U.S. PATENT DOCUMENTS

| | | | | |
|---|---|---|---|---|
| 2006/0170669 A1* | 8/2006 | Walker | ................. | G06F 3/0362 345/418 |
| 2010/0079654 A1* | 4/2010 | Egemo | ................. | G03B 17/00 348/333.01 |
| 2012/0069055 A1* | 3/2012 | Otsuki | ................. | G06F 3/017 345/681 |
| 2012/0285060 A1* | 11/2012 | Gross | ................. | A47G 1/065 40/711 |
| 2014/0098197 A1* | 4/2014 | Geris | ................. | H04N 13/296 348/48 |

(Continued)

*Primary Examiner* — Phi Hoang

(74) *Attorney, Agent, or Firm* — Arent Fox LLP; Michael Fainberg

(57) ABSTRACT

Embodiments of the disclosure disclose an intelligent picture frame, and a method for switching an image acquisition device in the intelligent picture frame. In this solution, there are a plurality of presentation states of the intelligent picture frame, where a plurality of image acquisition devices for finding a view in the respective presentation states are arranged on frame edges of the intelligent picture frame. An image acquisition device for finding a view is arranged separately on a frame edge of the intelligent picture frame in each presentation state, and when the intelligent picture frame in use transitions to whichever presentation state, switching can be made to the corresponding image acquisition device, so that there is a dedicated image acquisition device to find a view for the intelligent picture frame in whichever presentation state.

16 Claims, 3 Drawing Sheets

(56) References Cited

U.S. PATENT DOCUMENTS

| | | | |
|---|---|---|---|
| 2014/0206133 A1* | 7/2014 | Koezuka | H01L 29/66969 438/99 |
| 2015/0199003 A1* | 7/2015 | Zhang | G06F 3/013 345/156 |
| 2016/0275649 A1* | 9/2016 | Yang | G06F 3/0487 |

* cited by examiner

INTELLIGENT PICTURE FRAME, AND METHOD FOR SWITCHING AN IMAGE ACQUISTION DEVICE THEREIN

CROSS-REFERENCE TO RELATED APPLICATIONS

This application claims the priority to Chinese Patent Application No. 201710517874.8, filed on Jun. 29, 2017, the content of which is hereby incorporated by reference in its entirety.

FIELD

The present disclosure relates to the field of display technologies, and particularly to an intelligent picture frame, and a method for switching an image acquisition device therein.

BACKGROUND

An intelligent picture frame product has become increasingly popular, and has been embodied in an increasing number of forms. For example, a wall-hung large-size intelligent picture frame product can be hung on a wall in a landscape or portrait mode, and some product can be rotated into a landscape or portrait mode after it is hung.

There is an image acquisition device (e.g., a camera) arranged on the intelligent picture frame so that a human operator can interact with it, for example, a human face can be recognized, etc. However after the intelligent picture frame is rotated into a landscape or portrait mode, the position of the image acquisition device is also varied therewith, so that there is such an abnormal angle, at which a view is found, that makes the picture offset, and as a consequence, the picture to be acquired may not be positioned exactly at the center of the intelligent picture frame, thus degrading an effect of acquiring the image.

SUMMARY

The present disclosure provides an intelligent picture frame with a plurality of presentation states, wherein a plurality of image acquisition devices for finding a view in the respective presentation states are arranged on frame edges of the intelligent picture frame.

The present disclosure provides a method for switching an image acquisition device in the intelligent picture frame above, the method including: detecting whether there is a change to a presentation state of the intelligent picture frame; and if there is a change, then switching from an image acquisition device for finding a view in an original presentation state to an image acquisition device for finding a view in a changed presentation state.

DETAILED DESCRIPTION OF THE EMBODIMENTS

In order to address the technical problem above, the embodiments of the disclosure provide an intelligent picture frame, and a method for switching an image acquisition device therein. In this solution, an image acquisition device for finding a view is arranged separately on a frame edge of the intelligent picture frame in each presentation state, and when the intelligent picture frame in use transitions to whichever presentation state, switching can be made to the corresponding image acquisition device, so that there is a dedicated image acquisition device to find a view for the intelligent picture frame in whichever presentation state to thereby avoid an acquired portrait or ambient picture from being offset so as to improve the display effect and the effect of acquiring the image.

An intelligent picture frame, and a method for switching an image acquisition device therein according to the embodiments of the disclosure will be described below in further details with reference to the drawings.

An embodiment of the disclosure provides an intelligent picture frame with a plurality of presentation states, where a plurality of image acquisition devices for finding a view in the respective presentation states are arranged on frame edges of the intelligent picture frame.

In a particular implementation, optionally there are various image acquisition devices for finding a view in the respective presentation states, and for example, an image acquisition device for finding a view is a camera.

In a particular implementation, optionally the shape of the intelligent picture frame is a polygon; and the plurality of image acquisition devices are arranged respectively on different frame edges so that an object acquisition area is located at the center of an acquired picture of the intelligent picture frame, where there are N edges of the polygon, so there are N frame edges of the intelligent picture frame.

In a particular implementation, a picture is displayed with reference to a different frame edge in a different presentation state, so that the picture is presented in the intelligent picture frame in a different direction. Generally there are different presentation states for different shapes of the intelligent picture frame. An example thereof will be given below.

Optionally the shape of the intelligent picture frame is a polygon with a plurality of sets of parallel frame edges. Each set of parallel frame edges corresponds to one presentation state, and the image acquisition device for finding a view in the presentation state is arranged at the middle on one of frame edges in the set of frame edges.

Figure 1A:
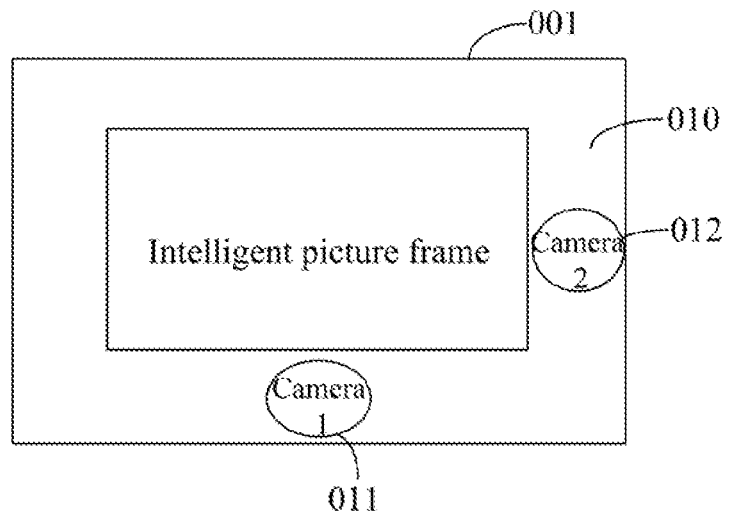
FIG. 1A is a schematic diagram of an intelligent picture frame according to an embodiment of the disclosure in a landscape presentation state.
Figure 1B:
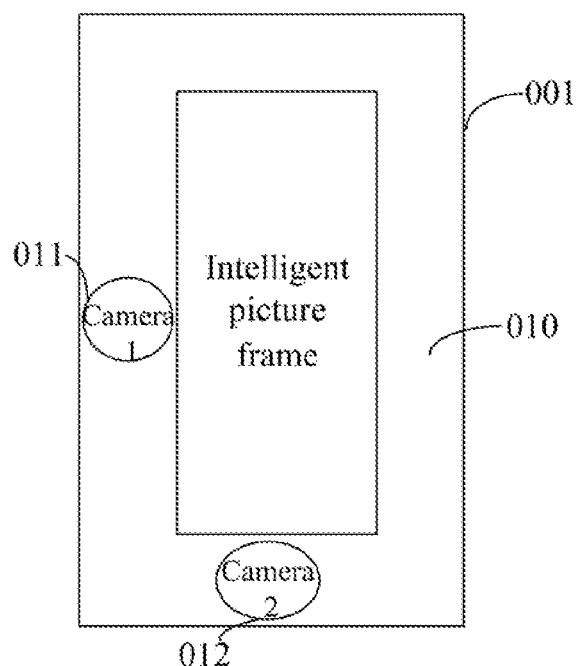
FIG. 1B is a schematic diagram of the intelligent picture frame according to the embodiment of the disclosure in a portrait presentation state.

For example, the shape of the intelligent picture frame is a rectangular with two sets of parallel frame edges, where the presentation state corresponding to one set of longer parallel frame edges is the landscape presentation state, and the presentation state corresponding to the other set of shorter parallel frame edges is the portrait presentation state. The image acquisition device for finding a view in the landscape presentation state is arranged at the middle of one of frame edges in the set of longer parallel frame edges, and the image acquisition device for finding a view in the portrait presentation state is arranged at the middle of one of frame edges in the set of shorter parallel frame edges. Referring to FIG. 1A and FIG. 1B, there are two cameras (represented as 011 and 012 in the figures) arranged on frame edges 010 of a rectangular intelligent picture frame 001, the camera 1 is arranged at the middle of a longer edge frame to find an image in the landscape presentation state, and the camera 2 is arranged at the middle of a shorter edge frame to find an image in the portrait presentation state. Referring to FIG. 1A, when the intelligent picture frame operates in the landscape presentation state, the camera 1 is enabled, and the camera 2 is disabled; and referring to FIG. 1B, when the landscape presentation state transitions to the portrait presentation state, the camera 2 is enabled, and the camera 1 is disabled, so that an image is acquired by the camera at the middle of the frame edge of the intelligent picture frame in either of the presentation states so that a portrait or ambient picture acquired in the object acquisition area will not be offset.

In addition to the rectangle illustrated above, the shape of the intelligent picture frame can be an equilateral hexagon, etc.

Optionally the shape of the intelligent picture frame is a regular polygon with nonparallel frame edges.

Each frame edge corresponds to one presentation state, and the image acquisition device for finding a view in the presentation state is arranged at the middle of the frame edge.

Figure 2A:
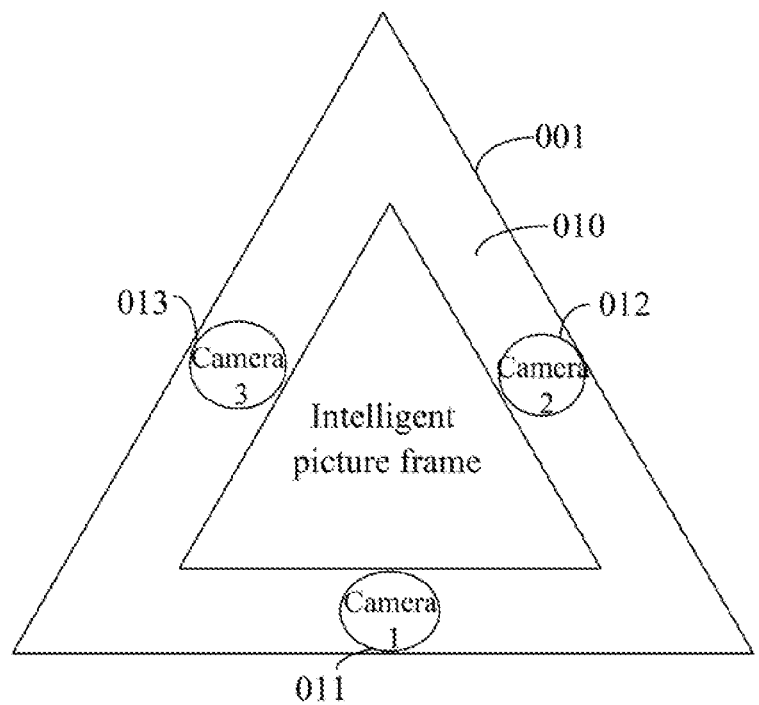
FIG. 2A is a schematic diagram of another intelligent picture frame according to the embodiment of the disclosure in a presentation state.
Figure 2B:
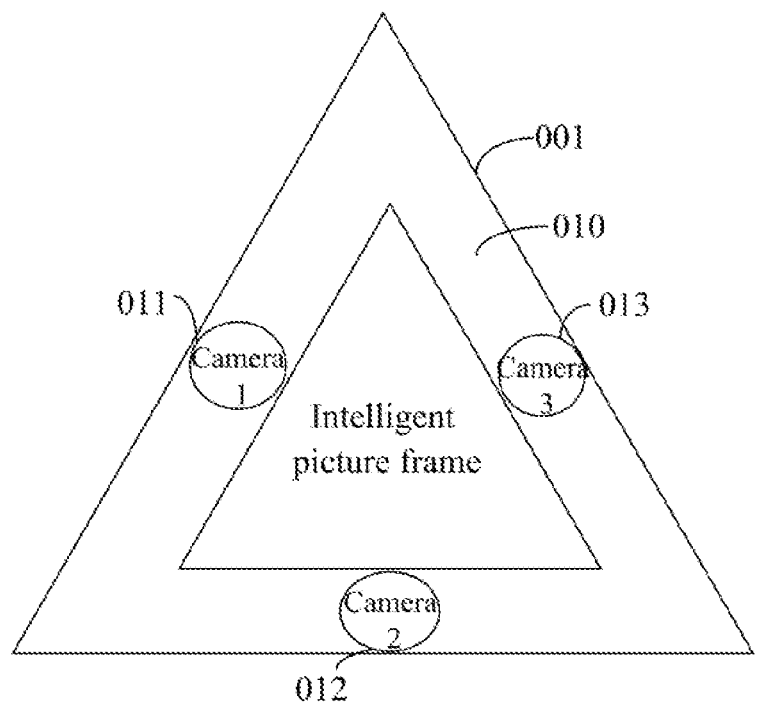
FIG. 2B is a schematic diagram of the other intelligent picture frame according to the embodiment of the disclosure in another presentation state.
Figure 2C:
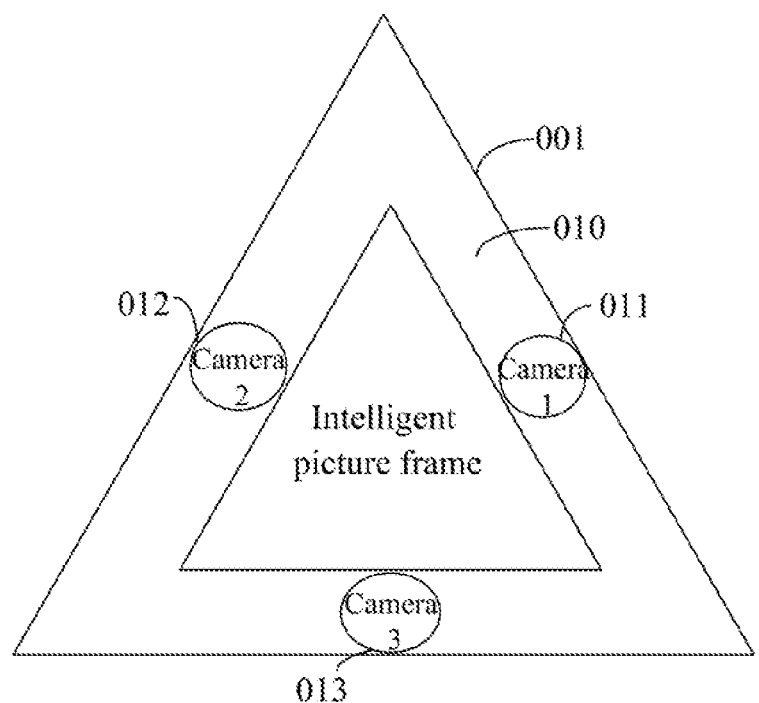
FIG. 2C is a schematic diagram of the other intelligent picture frame according to the embodiment of the disclosure in still another presentation state.

For example, the shape of the intelligent picture frame can be an equilateral triangle, so that three frame edges correspond to three presentation states, and an image acquisition device corresponding to each presentation state is arranged at the middle of each edge frame. In the three presentation states as illustrated in FIG. 2A, FIG. 2B, and FIG. 2C, there are three cameras arranged accordingly (represented as 011, 012, and 013 in the figures). The camera 1 is enabled, and the camera 2 and the camera 3 are disabled, in the presentation state illustrated in FIG. 2A; the camera 2 is enabled, and the camera 1 and the camera 3 are disabled, in the presentation state illustrated in FIG. 2B; and the camera 3 is enabled, and the camera 1 and the camera 2 are disabled, in the presentation state illustrated in FIG. 2C. In another example, the shape of the intelligent picture frame can alternatively be an equilateral pentagon, etc., although they will not be enumerated here.

Furthermore the shape of the intelligent picture frame can alternatively be an irregular polygon as long as an image acquisition device is arranged to find a view in each presentation state so that the object acquisition area can be located at the center of an image acquired in the intelligent picture frame.

In a particular application scenario, the intelligent picture frame in use can be fixed on a wall through being hung thereon, affixed thereto, etc., or can be fixed on a plane, etc.

Figure 3:
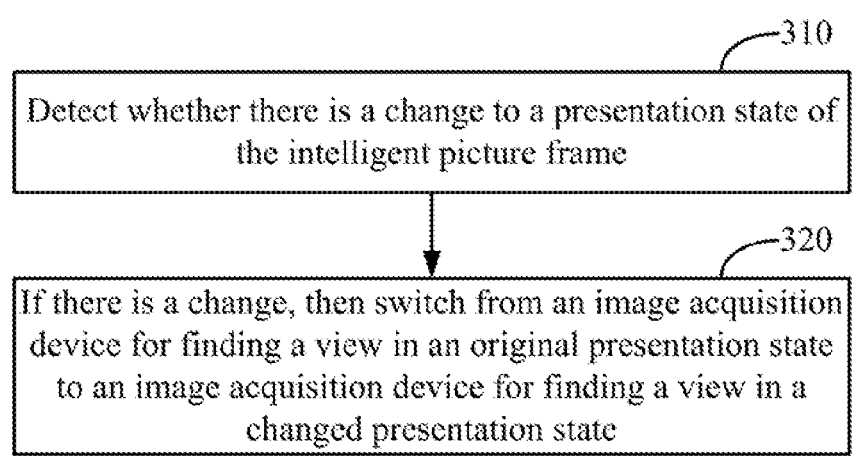
FIG. 3 is a flow chart of a method for switching an image acquisition device in an intelligent picture frame according to an embodiment of the disclosure.

Based upon the same inventive idea, an embodiment of the disclosure provides a method for switching an image acquisition device in the intelligent picture frame according to any one of the embodiments above, and referring to FIG. 3, the method includes at least the following steps.

The step 310 is to detect whether there is a change to a presentation state of the intelligent picture frame.

The step 320 is, if there is a change, to switch from an image acquisition device for finding a view in an original presentation state to an image acquisition device for finding a view in a changed presentation state.

In the embodiment of the disclosure, an image acquisition device for finding a view is arranged separately on a frame edge of the intelligent picture frame in each presentation state, and when the intelligent picture frame in use transitions to whichever presentation state, switching can be made to the corresponding image acquisition device, so that there is a dedicated image acquisition device to find a view for the intelligent picture frame in whichever presentation state to thereby avoid an acquired portrait or ambient picture from being offset so as to improve the display effect and the effect of acquiring the image.

In a particular implementation, optionally in the step 310 above, whether there is a change to the presentation state of the intelligent picture frame can be detected in a number of implementations, two of which will be exemplified below.

In an implementation, a change to the presentation state of the intelligent picture frame is detected by detecting a rotation signal of a knob switch for the presentation state. Particularly an electrode can be arranged at a preset position, and after the knob switch comes to the position, an electric signal can be transmitted.

In another implementation, a change to the presentation state of the intelligent picture frame is detected using a gravity sensor. In this embodiment, two implementations in which a change to the presentation state is detected have been exemplified, and there may be alternative implementations thereof, although they will not be enumerated here. Here the gravity sensor can particularly detect a change to the placement angle of the intelligent picture frame to thereby determine a change to the presentation state.

In a particular implementation, optionally before switching from the image acquisition device for finding a view in the original presentation state to the image acquisition device for finding a view in the changed presentation state, the method further includes: determining the changed presentation state.

Here the changed presentation state can be determined in a number of implementations, several of which will be exemplified below.

In a particular implementation, optionally before whether there is a change to the presentation state of the intelligent picture frame is detected, the switching method according to the embodiment of the disclosure further includes: after the position of the intelligent picture frame in use is fixed, acquiring a reference image using an image acquisition device for finding a view in each presentation state, and storing the reference image in correspondence; and accordingly the changed presentation state can be determined in the following particular implementation.

Each image acquisition device for finding a view is enabled respectively to acquire an image.

For each image acquisition device for finding a view, the acquired image is compared with the reference image stored in correspondence, and a matching extent is determined.

The presentation state corresponding to the image acquisition device with the highest matching extent is determined as the changed presentation state.

Optionally the changed presentation state can be determined in another particular implementation as follows.

Each image acquisition device for finding a view is enabled respectively to acquire an image.

The image acquired by each image acquisition device for finding a view is analyzed for an ambient picture, and an overlapping component or a mark in the picture is found.

Relative vertical heights of the respective image acquisition devices for finding a view are determined according to relative positions of the overlapping components or the marks in the pictures.

The changed presentation state is determined according to the determined relative vertical heights of the respective image acquisition devices for finding a view.

Optionally the changed presentation state can be determined in still another particular implementation as follows.

The placement angle of the intelligent picture frame is sensed using a gravity sensor.

The changed presentation state is determined according to the placement angle of the intelligent picture frame.

For example, the gravity sensor senses a change of the intelligent picture frame from the portrait mode to the landscape mode, that is, the intelligent picture frame is changed by 90 degrees, so that the displayed image is flipped automatically.

Here the gravity sensor can operate as in the prior art, so a repeated description thereof will be omitted here.

In a particular implementation, in a possible embodiment, the shape of the intelligent picture frame is a rectangle with two sets of parallel frame edges. There is an image acquisition device arranged at the middle of one of edge frames in one set of longer parallel edge frames; and there is an image acquisition device arranged at the middle of one of edge frames in one set of shorter parallel edge frames. In the intelligent picture frame as illustrated in FIG. 1A and FIG. 1B, a corresponding particular implementation of switching from the image acquisition device for finding a view in the original presentation state to the image acquisition device for finding a view in the changed presentation state can be as follows.

The image acquisition device in use is disabled, and the other image acquisition device is enabled.

In this embodiment, since only two image acquisition devices are arranged, switching can be made only between these two image acquisition devices. If a change to the presentation state is detected, then the image acquisition device will be switched, so after the presentation state is changed, the image acquisition device other than the image acquisition device in use before the presentation state is changed will be enabled simply.

The method for switching an image acquisition device in an intelligent picture frame according to the embodiment of the disclosure will be described below in further details taking a rectangular intelligent picture frame as an example.

In this embodiment, the intelligent picture frame illustrated in FIG. 1A and FIG. 1B is hung on a wall, and a camera of the intelligent picture frame is switched in the following implementations.

In a first implementation: There is also a gravity sensor arranged in the intelligent picture frame. While an image is being acquired, the current placement angle of the intelligent picture frame is detected using the gravity sensor; a change to the presentation state is determined upon detecting a change to the placement angle of the intelligent picture frame; a changed presentation state is determined according to the placement angle of the intelligent picture frame; and switching is made from a camera for finding a view before the change, to a camera for finding a view in the changed presentation state.

In a second implementation: After the intelligent picture frame is fixed on a wall, only the camera 1 is enabled in the landscape presentation state to take a reference image, which is saved in correspondence into a storage unit for use in comparison; and then only the camera 2 is enabled in the portrait presentation state to take a reference image, which is saved in correspondence into the storage unit for use in comparison.

While an image is being acquired, a user rotates a knob switch to change the presentation state of the intelligent picture frame, so that the knob switch transmits a rotation signal to a central processor. At this time, the camera 1 and the camera 2 are enabled to acquire images respectively. For the camera 1, the acquired image is compared with the reference image stored in correspondence, and a matching extent is obtained; for the camera 2, the acquired image is compared with the reference image stored in correspondence, and a matching extent is obtained; the presentation state corresponding to the camera with the higher matching extent is determined as a changed presentation state; and switching is made from a camera for finding a view in the original presentation state to a camera for finding a view in the changed presentation state. For example, the original presentation change is the landscape presentation state, the camera 1 is enabled, and after the presentation state is changed to the portrait presentation state, the position of the camera 1 is changed, so the acquired image is significantly different from the corresponding reference image, and there is a low matching extent; and the camera 2 is configured to find a view in the portrait presentation state, so the acquired image approximates the corresponding reference image, and there is a high matching extent, so that a decision can be made on switching to and enabling the camera 2.

In a third implementation: While an image is being acquired, a user rotates a knob switch to change the presentation state of the intelligent picture frame, so that the knob switch transmits a rotation signal to a central processor. At this time, the camera 1 and the camera 2 are enabled to acquire images respectively. Since the two cameras are located in the same vertical plane, there is an overlapping component or the same mark in pictures of their acquired images, so relative vertical heights of the camera 1 and the camera 2 can be determined according to the overlapping component or the same mark in the pictures, and a changed presentation state can be determined according to the relative vertical heights of the camera 1 and the camera 2; and switching can be made from a camera for finding a view in the original presentation state to a camera for finding a view in the changed presentation state. For example, the presentation state is changed to the portrait presentation state, the relative vertical height of the camera 1 is above that of the camera 2, and an overlapping component in their pictures is located at a lower position in the image of the camera 1. In another example, the presentation state is changed to the landscape presentation state, the relative vertical height of the camera 2 is above that of the camera 1, and an overlapping component in their pictures is located at a lower position in the image of the camera 2.

With the switching method above, after the intelligent picture frame is rotated, automatic switching can be made between the two cameras, so that the camera at the center of the picture frame is enabled, thus avoiding an acquired portrait or ambient picture from being offset.

In the intelligent picture frame, and the method for switching an image acquisition device therein according to the embodiments of the disclosure, an image acquisition device for finding a view is arranged separately on a frame edge of the intelligent picture frame in each presentation state, and when the intelligent picture frame in use transitions to whichever presentation state, switching can be made to the corresponding image acquisition device, so that there is a dedicated image acquisition device to find a view for the intelligent picture frame in whichever presentation state to thereby avoid an acquired portrait or ambient picture from being offset so as to improve the display effect and the effect of acquiring the image.

Those skilled in the art shall appreciate that the embodiments of the disclosure can be embodied as a method, a system or a computer program product. Therefore the disclosure can be embodied in the form of an all-hardware embodiment, an all-software embodiment or an embodiment of software and hardware in combination. Furthermore the disclosure can be embodied in the form of a computer program product embodied in one or more computer useable storage mediums (including but not limited to a disk memory, a CD-ROM, an optical memory, etc.) in which computer useable program codes are contained.

The disclosure has been described in a flow chart and/or a block diagram of the method, the device (system) and the computer program product according to the embodiments of the disclosure. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the disclosure have been described, those skilled in the art benefiting from the underlying inventive concept can make additional modifications and variations to these embodiments. Therefore the appended claims are intended to be construed as encompassing the preferred embodiments and all the modifications and variations coming into the scope of the disclosure.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

The invention claimed is:

1. A method for switching an image acquisition device in an intelligent picture frame with a plurality of presentation states, wherein a plurality of image acquisition devices for finding a view in the respective presentation states are arranged on frame edges of the intelligent picture frame, the method comprising:
    acquiring reference images using the respective image acquisition devices for finding a view in the respective presentation states, after a position of the intelligent picture frame in use is fixed;
    storing the reference images each corresponding to the respective image acquisition devices;
    detecting whether there is a change to a presentation state of the intelligent picture frame, and determining there is a change to a presentation state of the intelligent picture frame;
    enabling each image acquisition device for finding a view respectively to acquire an image;
    for each image acquisition device for finding a view, comparing the acquired image with the reference image stored in corresponding to the image acquisition device, and determining a matching extent;
    determining the presentation state corresponding to the image acquisition device with the highest matching extent as a changed presentation state;
    switching from an image acquisition device for finding a view in an original presentation state to an image acquisition device for finding a view in the changed presentation state.

2. The switching method according to claim 1, wherein the detecting whether there is a change to the presentation state of the intelligent picture frame comprises:
    detecting whether there is a change to the presentation state of the intelligent picture frame by detecting a rotation signal of a knob switch for the presentation state.

3. The switching method according to claim 1, wherein the detecting whether there is a change to the presentation state of the intelligent picture frame comprises:
    detecting a change to the presentation state of the intelligent picture frame using a gravity sensor.

4. The switching method according to claim 1, wherein a shape of the intelligent picture frame is a rectangle with two sets of parallel frame edges, wherein there is an image acquisition device arranged at the middle of one of edge frames in one set of longer parallel edge frames; and there is an image acquisition device arranged at the middle of one of edge frames in one set of shorter parallel edge frames; and
    switching from the image acquisition device for finding a view in the original presentation state to the image acquisition device for finding a view in the changed presentation state comprises:
    disabling the image acquisition device in use, and enabling the other image acquisition device.

5. The switching method according to claim 1, wherein a shape of the intelligent picture frame is a polygon; and the plurality of image acquisition devices are arranged respectively on different frame edges so that an object acquisition area is located at a center of an acquired picture of the intelligent picture frame.

6. The switching method according to claim 1, wherein a shape of the intelligent picture frame is a polygon with a plurality of sets of parallel frame edges; and
    each set of parallel frame edges corresponds to one presentation state, and the image acquisition device for finding a view in the presentation state is arranged at the middle of one of frame edges in the set of frame edges.

7. The switching method according to claim 1, wherein a shape of the intelligent picture frame is a regular polygon with nonparallel frame edges; and each frame edge corresponds to one presentation state, and the image acquisition device for finding a view in the presentation state is arranged at the middle of the frame edge.

8. The switching method according to claim 1, wherein the image acquisition devices for finding a view are cameras.

9. A method for switching an image acquisition device in an intelligent picture frame with a plurality of presentation states, wherein a plurality of image acquisition devices for finding a view in the respective presentation states are arranged on frame edges of the intelligent picture frame, the method comprises:

detecting whether there is a change to a presentation state of the intelligent picture frame, and determining there is a change to a presentation state of the intelligent picture frame;

enabling each image acquisition device for finding a view respectively to acquire an image;

analyzing the image, acquired by each image acquisition device for finding a view, for an ambient picture, and finding an overlapping component or a mark in the picture;

determining relative vertical heights of the respective image acquisition devices for finding a view according to relative positions of the overlapping components or the marks in the pictures;

determining a changed presentation state according to the determined relative vertical heights of the respective image acquisition devices for finding a view; and switching from an image acquisition device for finding a view in an original presentation state to an image acquisition device for finding a view in the changed presentation state.

10. The switching method according to claim 9, wherein detecting whether there is a change to the presentation state of the intelligent picture frame comprises:

detecting whether there is a change to the presentation state of the intelligent picture frame by detecting a rotation signal of a knob switch for the presentation state.

11. The switching method according to claim 9, wherein detecting whether there is a change to the presentation state of the intelligent picture frame comprises:

detecting a change to the presentation state of the intelligent picture frame using a gravity sensor.

12. The switching method according to claim 9, wherein a shape of the intelligent picture frame is a rectangle with two sets of parallel frame edges, wherein there is an image acquisition device arranged at the middle of one of edge frames in one set of longer parallel edge frames; and there is an image acquisition device arranged at the middle of one of edge frames in one set of shorter parallel edge frames; and switching from the image acquisition device for finding a view in the original presentation state to the image acquisition device for finding a view in the changed presentation state comprises:

disabling the image acquisition device in use, and enabling the other image acquisition device.

13. The switching method according to claim 9, wherein a shape of the intelligent picture frame is a polygon; and the plurality of image acquisition devices are arranged respectively on different frame edges so that an object acquisition area is located at a center of an acquired picture of the intelligent picture frame.

14. The switching method according to claim 9, wherein a shape of the intelligent picture frame is a polygon with a plurality of sets of parallel frame edges; and each set of parallel frame edges corresponds to one presentation state, and the image acquisition device for finding a view in the presentation state is arranged at the middle of one of frame edges in the set of frame edges.

15. The switching method according to claim 9, wherein a shape of the intelligent picture frame is a regular polygon with nonparallel frame edges; and each frame edge corresponds to one presentation state, and the image acquisition device for finding a view in the presentation state is arranged at the middle of the frame edge.

16. The switching method according to claim 9, wherein the image acquisition devices for finding a view are cameras.

* * * * *